US011778053B1

(12) United States Patent
Allen

(10) Patent No.: US 11,778,053 B1
(45) Date of Patent: Oct. 3, 2023

(54) FAULT-TOLERANT FUNCTION PLACEMENT FOR EDGE COMPUTING

(71) Applicant: Amazon Technologies, Inc., Seattle, WA (US)

(72) Inventor: Nicholas Alexander Allen, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 371 days.

(21) Appl. No.: 16/898,880

(22) Filed: Jun. 11, 2020

(51) Int. Cl.
*H04L 67/00* (2022.01)
*H04L 41/0823* (2022.01)
*H04L 41/50* (2022.01)
*G06N 20/00* (2019.01)

(52) U.S. Cl.
CPC ............ *H04L 67/34* (2013.01); *G06N 20/00* (2019.01); *H04L 41/0836* (2013.01); *H04L 41/5096* (2013.01)

(58) Field of Classification Search
CPC .. H04L 67/34; H04L 41/0836; H04L 41/5096
See application file for complete search history.

(56) References Cited

U.S. PATENT DOCUMENTS

| | | | | |
|---|---|---|---|---|
| 9,336,030 | B1 * | 5/2016 | Marr | G06F 9/5077 |
| 10,874,941 | B2 * | 12/2020 | Peitzer | A63F 13/332 |
| 11,297,622 | B1 * | 4/2022 | Moore | H04L 47/82 |
| 11,349,935 | B2 * | 5/2022 | Bhatnagar | H04L 67/1021 |
| 2013/0212578 | A1 * | 8/2013 | Garg | H04L 47/122 718/1 |
| 2013/0346619 | A1 * | 12/2013 | Panuganty | H04L 41/12 709/226 |
| 2016/0359872 | A1 * | 12/2016 | Yadav | H04L 63/20 |
| 2018/0367412 | A1 * | 12/2018 | Sethi | H04L 41/12 |
| 2019/0163538 | A1 * | 5/2019 | Klein | G06F 9/5077 |
| 2019/0310881 | A1 * | 10/2019 | Gupta | G06F 9/45533 |
| 2020/0029199 | A1 * | 1/2020 | Sen | H04L 41/0895 |
| 2020/0133859 | A1 * | 4/2020 | Gottin | G06F 12/0806 |
| 2020/0409761 | A1 * | 12/2020 | Stuntebeck | G06N 20/00 |
| 2021/0029204 | A1 * | 1/2021 | Bhatnagar | H04L 41/0813 |
| 2021/0299574 | A1 * | 9/2021 | Pare | A63F 13/77 |

* cited by examiner

*Primary Examiner* — Philip C Lee
(74) *Attorney, Agent, or Firm* — NICHOLSON DE VOS WEBSTER & ELLIOTT LLP

(57) ABSTRACT

Techniques for fault-tolerant function placement across multiple computing placement locations are described. An application placement service obtains a latency-based placement of functions of an application and utilizes resource information associated with the placement locations to determine error rates for flows of the placement. For flows having an error rate falling outside of an allowable range, the application placement service can modify the placement to improve the error rate, e.g., by adding additional redundancy for functions in higher-error placement locations within those placement location tiers, and/or by adding additional redundancy for functions in higher-error placement locations within different placement location tiers.

17 Claims, 11 Drawing Sheets

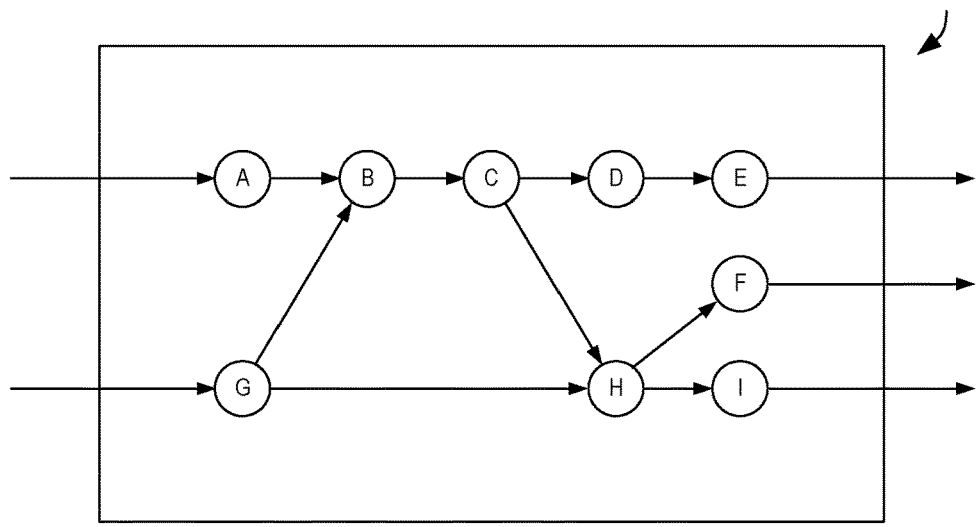
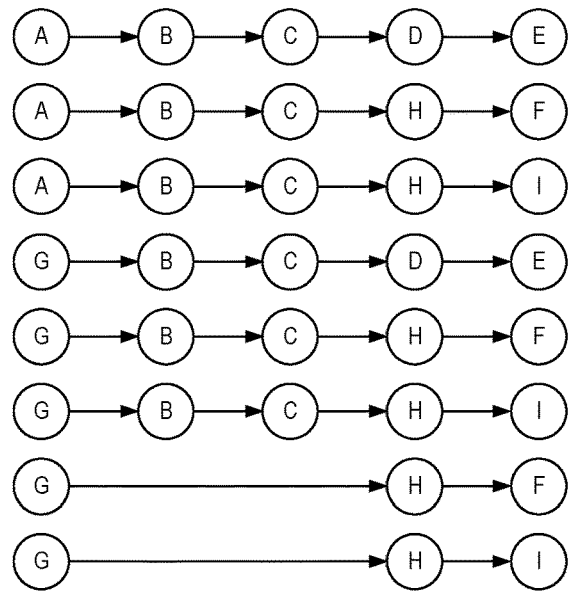
FIG. 4

FAULT-TOLERANT FUNCTION PLACEMENT FOR EDGE COMPUTING

BACKGROUND

Function placement deals with the partitioning and allocation of computational tasks in a streaming or event-driven system. A common environment requiring function placement is one attempting to utilize edge computing. For example, an augmented reality system that overlays information in real-time over a user's display may utilize multiple computational tasks to filter, classify, catalog, and otherwise process data. Some of these tasks may require computational resources in excess of what is available on that user's local device, and thus, must rely on processing that occurs elsewhere. Accordingly, the intelligent assignment of these computational tasks to computational resources introduces a variety of choices.

BRIEF DESCRIPTION OF DRAWINGS

Various embodiments in accordance with the present disclosure will be described with reference to the drawings, in which:

FIG. 4 is a diagram illustrating an exemplary directed acyclic graph of functions of an application and corresponding linear flows according to some embodiments.

DETAILED DESCRIPTION

Figure 1:
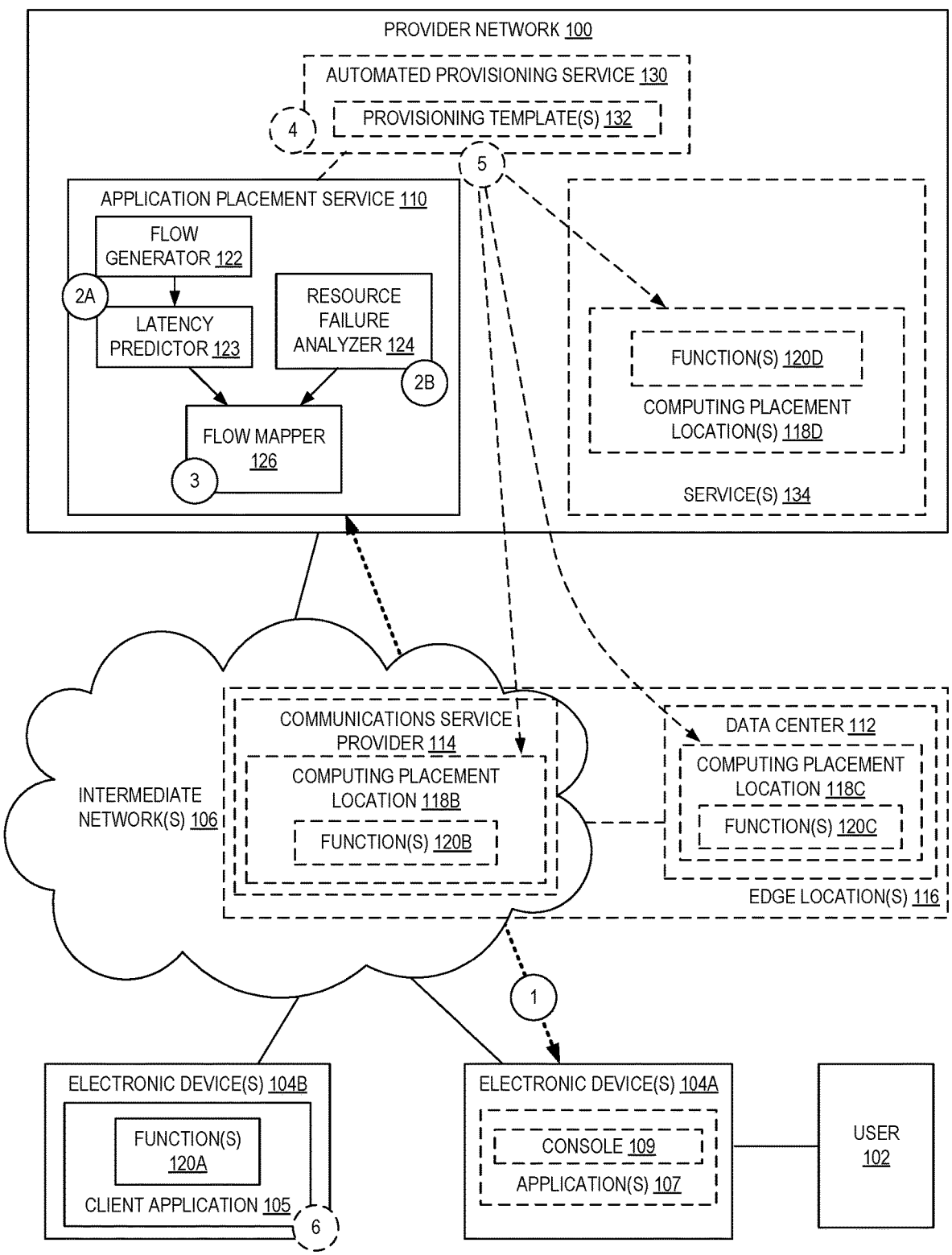
FIG. 1 is a diagram illustrating an environment for fault-tolerant function placement according to some embodiments.

The present disclosure relates to methods, apparatus, systems, and non-transitory computer-readable storage media for fault-tolerant placement of functions across multiple placement location tiers. According to some embodiments, the placement of multiple functions (also sometimes referred to as "operators" or "components") of an application across multiple computing placement location tiers can be intelligently performed based at least in part on an acceptable level of failure associated with the application. Accordingly, in some embodiments, placements can be found that not only provide a deployment configuration across multiple computing placement locations with sufficiently low latency, but that also ensure a sufficiently low error rate, such as in the form of a bounded estimated probability on the error rate expected for the overall application.

In some embodiments, a set of functions for an application (or identifiers thereof) are obtained by an application placement service from a user, such as a part of an application description identifying flows of the application that traverse particular functions. The application description may include a directed acyclic graph (DAG) encoding these flows or may include sufficient information allowing for a DAG to be generated therefrom. Flows of the DAG may be linearized to generate linear flows, each representing a particular path through the application from a beginning point to an ending point.

In some embodiments, the operational performance of the functions is measured, predicted, and/or specified by a user for one or various computing environments. This performance information can be used to assist in predicting the latency for ones of the linear flows, such as through the use of machine learning (ML) based inference, statistical modeling, and the like.

Failure rates associated with various computing resource deployment locations can be obtained, e.g., based on historical observational data, and used by a flow mapper together with the predicted latencies of the flows to generate placements across multiple computing deployment locations based on one or more characteristics of these locations (e.g., latencies, resource availabilities, estimated failure rates, and the like) together with any user-provided preferences or constraints. For example, in some embodiments a user may provide a placement goal indicating that a placement is sought having a maximum estimated overall error rate (or a range of error rates) while having a low overall estimated latency, and the system can flexibly identify placements conforming to these goals or constraints. In some embodiments, descriptions of the placements can be provided by the application placement service to the user to allow the user to deploy the resources, or the application placement service can streamline the deployment of some or all functions for the user according to the determined placement. For example, in some embodiments the application placement service may utilize an automated provisioning service to generate an application template that, when launched, can be used by the automated provisioning service to quickly and reliably provision the functions of the application in the necessary computing placement locations stipulated by the placement.

Accordingly, in some embodiments, functions of an application can be placed across multiple different tiers of computing resource availability locations while adhering to particular user requirements such as overall latency as well as failure accommodation, instead of relying on more simplistic placement approaches that may utilize only, for example, latency considerations.

FIG. 1 is a diagram illustrating an environment for fault-tolerant function placement according to some embodiments. In FIG. 1, an application placement service 110 is implemented as software within a multi-tenant cloud provider network 100 using one or multiple computing devices to perform fault-tolerant function placement operations disclosed herein; however, in other embodiments the application placement service 110 can be implemented in other environments, such as an application deployed within another type of public or private data center, as an application executed by a user's personal computer (PC) or server computing device, etc.

As described herein, a user 102 of the application placement service 110 may seek to deploy functions 120A-120C of an application across one or more of multiple computing placement locations 118 based on some preference or requirements, which may include edge locations 116 (e.g., functions 120B or functions 120C) of the provider network, cloud provider network 100 locations (e.g., functions 120D executed by one or more services 100 such as a hardware virtualization service or on-demand code execution service within a region or zone of the provider network), on-device locations (e.g., as functions 120A executed by a client application 105 of a user's electronic device 104B), external data center 112 locations (e.g., in a data center associated with the user or user organization, or operated by another service provider entity), etc. The user 102 may utilize an application 107 (e.g., a web-application implementing a console 109 for the provider network 100, a standalone application, a plugin to another application, etc.) executed by an electronic computing device 104A to interact with the application placement service 110 across one or more intermediate networks 106 as shown by circle (1). In some embodiments, the user 102 may interact with a general console of the provider network 100 and utilize one or more user interface elements (e.g., a button, link, text box, radio button, etc.) to navigate to a user interface associated with the application placement service 110.

As described further herein, the user 102 may provide an application description, or functions of the application itself, to the application placement service 110. As detailed herein, the user 102 may also provide one or more deployment criteria indicating requirements or restrictions on a valid deployment, which may be based on one or more factors such as an estimated error rate probability of the deployment (or portions thereof, such as that of an individual flow), an estimated latency of the deployment (or portions thereof), etc.

The application description may include a graph of flows of the application, or include data (e.g., a textual definition of the application and its connectivity) allowing the application placement service 110—via its flow generator 122—to generate a graph of flows. Alternatively, or additionally, the user may provide functions of the application itself (e.g., source code for the application), which can be analyzed by the flow generator 122 to determine the flows of the application. At circle (2A), the latency predictor 123 module may determine estimated latencies for individual functions and/or complete flows, which may include the training and/or use of machine learning models to infer per-function and/or per-flow latencies. At circle (2B), a resource failure analyzer 124 may also maintain a catalog of available computing resource locations, which may include information such as their resource availabilities, failure rates, etc. With the information from the latency predictor 123 and the resource failure analyzer 124, a flow mapper 126 at circle (3) can generate one—or more—placement configurations indicating where the functions should be placed to satisfy latency and also error rate requirements for the application, such as those indicated by user-provided one or more deployment criteria. The placement configuration information can be provided back to the user 102 (e.g., via messaging between the application placement service 110 and the electronic device(s) 104A), or used to launch resources to implement the functions—either automatically, or per a subsequent user request.

For example, at optional dashed circle (4), the application placement service 110 may generate one or more provisioning templates 132 that specify what resources are to be launched and where these resources are to be launched for the functions of the application according to the configuration(s). On its own, or after a user request, the automated provisioning service 130 may be invoked at circle (4) by the application placement service 110 or electronic device(s) 104A, causing a provisioning template 132 to be used to launch resources for the functions 120—e.g., virtual machines, networking components, security rules, etc.—in necessary locations indicated by the configuration, such as placing functions 120B within an edge location 116 at a placement location 118B of a communications service provider 114, placing functions 120C within an edge location 116 at a placement location 118C of an external data center 112, placing functions 120D within one or more placement locations 118D provided by one or more services 134 of the provider network, such as a hardware virtualization service, a storage service, an on-demand serverless code execution service, a database service, or the like. Upon the user 102 configuring the client application 105 at circle (6) to implement any functions 120A itself and to make use of the remote functions 120B and/or 120C (e.g., by calling endpoints provided by the provider network 100), the application will function.

A cloud provider network 100, often referred to as a "cloud," commonly refers to a large pool of network-accessible computing resources such as compute, storage, and networking resources, applications, and services. A cloud can provide convenient, on-demand network access to a shared pool of configurable computing resources that can be programmatically provisioned and released in response to customer commands Cloud computing can thus be considered as both the applications delivered as services over a publicly accessible network (e.g., the Internet, a cellular communication network) and the hardware and software in cloud provider data centers that provide those services.

Some users may desire to use the resources and services of such cloud provider networks, but for various reasons (e.g., latency in communications with customer devices, legal compliance, security, or other reasons) prefer for these resources and services to be provisioned within their own network (for example on premises of the user), at a separate network managed by the cloud provider, within a network of a communications service provider, or within another independent network. These external segments of a cloud provider network 100—referred to herein as an "edge location" or provider substrate extension ("PSE")—can be provisioned within a network that is independent from the cloud provider network 100. These types of edge locations 116 may make up one or more placement location tiers (e.g., all communications service provider (CSP) 114 locations may make up a single "tier" or, alternatively, the CSP 114 location(s) and other edge locations disclosed herein may make up a single tier) that a customer may wish to utilize, in whole or likely in part, to deploy an application.

A cloud provider network 100 typically includes a physical network (e.g., sheet metal boxes, cables, rack hardware) referred to as the substrate. The substrate can be considered as a network fabric containing the physical hardware that runs the services of the provider network. In some implementations, a PSE may be an extension of the cloud provider network substrate formed by one or more servers located on-premise in a customer or partner facility (e.g., in a data center 112), at a separate cloud provider-managed facility, at a communications service provider 114 facility, or other facility including servers wherein such server(s) communicate over a network (e.g., a publicly-accessible network 106 such as the Internet) with a nearby availability zone or region of the cloud provider network. Customers may access a provider substrate extension via the cloud provider substrate or another network, and may use the same application programming interfaces (APIs) to create and manage resources in the provider substrate extension as they would use to create and manage resources in the region of a cloud provider network.

As indicated above, one example type of edge location is one that is formed by servers located on-premise in a customer or partner facility. This type of substrate extension located outside of cloud provider network data centers can be referred to as an "outpost" of the cloud provider network. Another example type of edge location is one that is formed by servers located in a facility managed by the cloud provider but that includes data plane capacity controlled at least partly by a remote/distinct control plane of the cloud provider network.

In some embodiments, another example of a provider substrate extension is a network deployed at a communications service provider 114. Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), WiFi providers (e.g., at locations such as hotels, coffee shops, airports, etc.), etc. While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles. Thus, as used herein, the computing resources of a cloud provider network installed within a communications service provider 114 network may be referred to as cloud provider network edge locations (or simply edge locations) as they are closer to the "edge" where end users connect to a network compared to computing resources in a more centralized data center (e.g., within a provider network 100), which are typically "farther" from these users (e.g., in terms of geographic distance, network distance, or the like). Such edge locations may include one or more networked computer systems that provide customers of the cloud provider network with computing resources to serve end users with lower latency than would otherwise be achievable if those compute instances were hosted in a data center site. An edge location deployed in a communication service provider 114 network may also be referred to as a "wavelength zone."

As indicated above, a cloud provider network 100 typically refers to a pool of network-accessible computing resources (such as compute, storage, and networking resources, applications, and services), which may be virtualized or bare-metal. A cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., user 102) can connect to virtualized computing devices and other cloud provider network 100 resources and services using various interfaces (e.g., APIs) via one or more intermediate network(s) 106. An API refers to an interface and/or communication protocol between a client (e.g., an electronic device 104A) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network referred to as the substrate that can be considered as a network fabric containing the physical hardware that runs the services of the provider network. The substrate may be isolated from the rest of the cloud provider network 100; for example, it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client Internet Protocol (IP) packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer device, for example as virtual machines (VMs) on a compute server. A hypervisor, or virtual machine monitor (VMM), may exist on a host to allocate the host's hardware resources amongst various VMs on the host and monitor the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

The traffic and operations of the cloud provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible and can be implemented by those of skill in the art.

As illustrated, the data plane can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or, a "hardware virtualization service") of the cloud provider network. The virtualized computing service may be part of the control plane, allowing customers to issue commands via an interface (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers, which can include persistent storage for storing volumes of customer data as well as software for managing these volumes. These block store servers can support a managed block storage service of the cloud provider network. The managed block storage service may be part of the control plane 114A, allowing customers to issue commands via the interface (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers, which represent another type of storage within the cloud provider network. The object storage servers include one or more servers on which data is stored as objects within resources referred to as buckets (or folders, directories, etc.) and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

An edge location 116 provides resources and services of the cloud provider network 100 within a separate network, thereby extending functionality of the cloud provider network 100 to new locations (e.g., for reasons related to latency in communications with customer devices, legal compliance, security, etc.). As indicated, such provider substrate extensions can include cloud provider network-managed provider substrate extensions (e.g., formed by servers located in a cloud provider-managed facility separate from those associated with the cloud provider network 100), communications service provider 114 substrate extensions (e.g., formed by servers associated with communications service provider 114 facilities), customer-managed provider substrate extensions (e.g., formed by servers located on-premise in a customer or partner facility such as a data center 112), among other possible types of edge locations.

An edge location, similar to the logically centralized (but typically, highly geographically distributed) provider network 100 may include a logical separation between a control plane and a data plane, respectively extending the control plane and data plane of the cloud provider network 100. The edge location may be pre-configured, e.g. by the cloud provider network operator, with an appropriate combination of hardware with software and/or firmware elements to support various types of computing-related resources, and to do so in a manner that mirrors the experience of using the cloud provider network. For example, one or more edge location servers can be provisioned by the cloud provider for deployment within an edge location 116. As described above, the cloud provider network 100 may offer a set of predefined instance types, each having varying types and quantities of underlying hardware resources. Each instance type may also be offered in various sizes. In order to enable customers to continue using the same instance types and sizes in an edge location 116 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 100 and the cloud provider network provider substrate extension.

As illustrated, the edge location servers can host one or more compute instances. Compute instances can be VMs, or containers that package up code and all its dependencies so an application can run quickly and reliably across computing environments (e.g., including VMs). In addition, the servers may host one or more data volumes, if desired by the customer. In the region of a cloud provider network 100, such volumes may be hosted on dedicated block store servers. However, due to the possibility of having a significantly smaller capacity at an edge location 116 than in the region, an optimal utilization experience may not be provided if the provider substrate extension includes such dedicated block store servers. Accordingly, a block storage service may be virtualized in the edge location, such that one of the VMs runs the block store software and stores the data of a volume. Similar to the operation of a block storage service in the region of a cloud provider network 100, the volumes within an edge location 116 may be replicated for durability and availability. The volumes may be provisioned within their own isolated virtual network within the provider substrate extension 102. The compute instances and any volumes collectively make up a data plane extension of the provider network data plane within the edge location 116.

The servers within an edge location 116 may, in some implementations, host certain local control plane components, for example, components that enable the edge location to continue functioning if there is a break in the connection back to the cloud provider network 100. Examples of these components include a migration manager that can move compute instances between edge location servers as needed to maintain availability, a key value data store that indicates where volume replicas are located, etc. However, generally the control plane functionality for an edge location remains in the cloud provider network 100 in order to allow customers to use as much resource capacity of the provider substrate extension as possible.

Server software running at an edge location 116 may be designed by the cloud provider to run on the cloud provider substrate network, and this software may be enabled to run unmodified in an edge location 116 by using local network manager(s) to create a private replica of the substrate network within the edge location (a "shadow substrate"). The local network manager(s) can run on provider substrate extension 102 servers and bridge the shadow substrate with the provider substrate extension network, for example, by acting as a virtual private network (VPN) endpoint or endpoints between the edge location and proxies in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) allows resources in the edge location to seamlessly communicate with resources in the cloud provider network 100. In some implementations, a single local network manager can perform these actions for all servers hosting compute instances in an edge location 116. In other implementations, each of the server hosting compute instances may have a dedicated local network manager. In multi-rack edge locations, inter-rack communications can go through the local network managers, with local network managers maintaining open tunnels to one another.

Edge locations 116 can utilize secure networking tunnels through the provider substrate extension network to the cloud provider network 100, for example, to maintain security of customer data when traversing the provider substrate extension 102 network and any other intermediate network (which may include the public internet). Within the cloud provider network 100, these tunnels are composed of virtual infrastructure components including isolated virtual networks (e.g., in the overlay network), control plane proxies, data plane proxies, and substrate network interfaces. Such proxies may be implemented as containers running on compute instances. In some embodiments, each server in an edge location 116 location that hosts compute instances can utilize at least two tunnels: one for control plane traffic (e.g., Constrained Application Protocol (CoAP) traffic) and one for encapsulated data plane traffic. A connectivity manager within the cloud provider network manages the cloud provider network-side lifecycle of these tunnels and their components, for example, by provisioning them automatically when needed and maintaining them in a healthy operating state. In some embodiments, a direct connection between an edge location 116 location and the cloud provider network 100 can be used for control and data plane communications. As compared to a VPN through other networks, the direct connection can provide constant bandwidth and more consistent network performance because of its relatively fixed and stable network path.

A control plane (CP) proxy can be provisioned in the cloud provider network 100 to represent particular host(s) in an edge location. CP proxies are intermediaries between the control plane in the cloud provider network 100 and control plane targets in the control plane of provider substrate extension 102. That is, CP proxies provide infrastructure for tunneling management API traffic destined for provider substrate extension servers out of the region substrate and to the provider substrate extension 102. For example, a virtualized computing service of the cloud provider network 100 can issue a command to a VMM of a physical server at an edge location 116 to launch a compute instance. A CP proxy maintains a tunnel (e.g., a VPN) to a local network manager of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at an edge location 116 or may be able to manage control plane traffic for multiple servers in the same provider substrate extension.

A data plane (DP) proxy can also be provisioned in the cloud provider network 100 to represent particular server(s) in an edge location 116. The DP proxy acts as a shadow or anchor of the server(s) and can be used by services within the cloud provider network 100 to monitor health of the host (including its availability, used/free compute and capacity, used/free storage and capacity, and network bandwidth usage/availability). The DP proxy also allows isolated virtual networks to span provider substrate extensions and the cloud provider network 100 by acting as a proxy for server(s) in the cloud provider network 100. Each DP proxy can be implemented as a packet-forwarding compute instance or container. As illustrated, each DP proxy can maintain a VPN tunnel with a local network manager that manages traffic to the server(s) that the DP proxy represents. This tunnel can be used to send data plane traffic between the provider substrate extension server(s) and the cloud provider network 100. Data plane traffic flowing between an edge location 116 and the cloud provider network 100 can be passed through DP proxies associated with that provider substrate extension. For data plane traffic flowing from an edge location 116 to the cloud provider network 100, DP proxies can receive encapsulated data plane traffic, validate it for correctness, and allow it to enter into the cloud provider network 100. DP proxies can forward encapsulated traffic from the cloud provider network 100 directly to an edge location 116.

Local network manager(s) can provide secure network connectivity with the proxies established in the cloud provider network 100. After connectivity has been established between the local network manager(s) and the proxies, customers may issue commands via the interface to instantiate compute instances (and/or perform other operations using compute instances) using provider substrate extension resources in a manner analogous to the way in which such commands would be issued with respect to compute instances hosted within the cloud provider network 100. From the perspective of the customer, the customer can now seamlessly use local resources within a provider substrate extension (as well as resources located in the cloud provider network 100, if desired). The compute instances set up on a server at an edge location 116 may communicate both with electronic devices located in the same network as well as with other resources that are set up in the cloud provider network 100, as desired. A local gateway can be implemented to provide network connectivity between an edge location 116 and a network associated with the extension (e.g., a communications service provider network).

There may be circumstances that necessitate the transfer of data between the object storage service and an edge location 116. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, the PSE forms an edge location, in that it provides the resources and services of the cloud provider network outside of a traditional cloud provider data center and closer to customer devices. Edge locations, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "local zones" or "near zones" (due to being near to customer workloads). A far zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

As indicated herein, a cloud provider network can be formed as a number of regions, where a region is a separate geographical area in which the cloud provider has one or more data centers. Each region can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations can be much higher. Such widespread deployment of edge locations can provide low-latency connectivity to the cloud for a much larger group of end user devices (in comparison to those that happen to be very close to a regional data center). In some embodiments, each edge location can be peered to some portion of the cloud provider network (e.g., a parent availability zone or regional data center). Such peering allows the various components operating in the cloud provider network to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

Each region can include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to an AZ of the cloud provider network via a publicly accessible network (e.g., the Internet, a cellular communication network).

The parenting of a given edge location to an AZ or region of the cloud provider network can be based on a number of factors. One such parenting factor is data sovereignty. For example, to keep data originating from a CSP network in one country within that country, the edge locations deployed within that CSP network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a CSP network has latency benefits, those benefits might be negated by parenting an edge location to a distant AZ or region that introduces significant latency for edge location to region traffic. Accordingly, edge locations are often parented to nearby (in terms of network latency) AZs or regions.

One benefit provided by the utilization of edge locations with backing cloud provider networks is that computing resources implemented within edge locations are "closer" to end users, and thus such architectures provide extremely low-latency interactions preferred by modern computing applications, such as video gaming, communications, etc. Thus, systems employing edge locations can satisfy customer use cases requiring low client latency and can allow users to launch compute instances (and other computing resources) around geographic areas to guarantee reliably low latencies for all clients in the coverage area. Moreover, such systems can provide a way for clients—e.g., mobile clients or wired clients—to be able to easily "discover" which computing instance(s) implementing an application they should connect to, given their current location.

Figure 2:
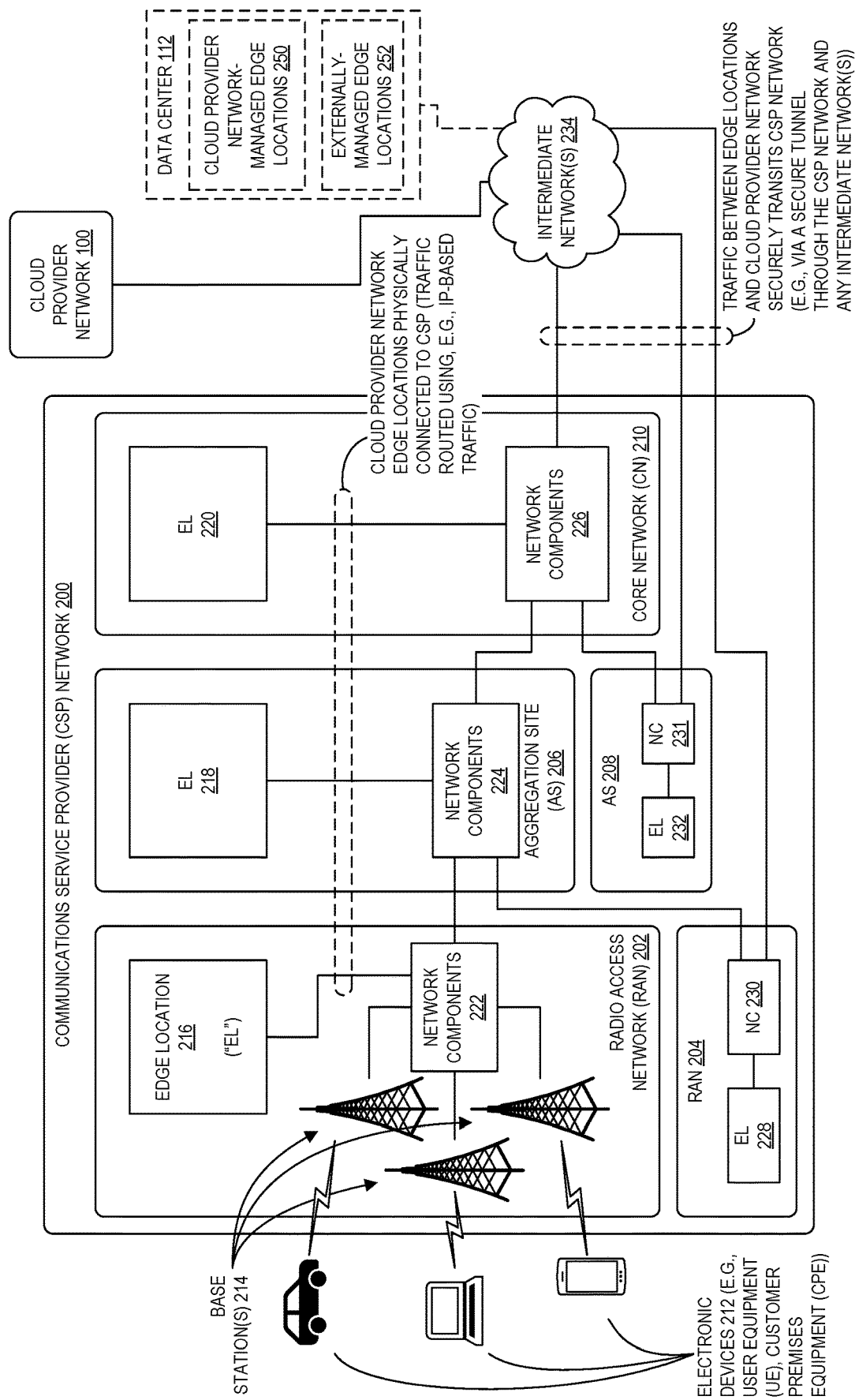
FIG. 2 illustrates an exemplary system with cloud provider network edge locations including those deployments within a communications service provider network according to some embodiments.

FIG. 2 illustrates an exemplary system in which cloud provider network edge locations are deployed within a CSP network according to some embodiments. A CSP network 200 generally includes a downstream interface to end user electronic devices (e.g., electronic devices 104A-104B, 212) and an upstream interface to other networks (e.g., the internet). In this example, the CSP network 200 is a wireless "cellular" CSP network that includes radio access networks (RAN) 202, 204, aggregation sites (AS) 206, 208, and a core network (CN) 210. The RANs 202, 204 include base stations (e.g., NodeBs, eNodeBs, gNodeBs) that provide wireless connectivity to electronic devices 212. The core network 210 typically includes functionality related to the management of the CSP network (e.g., billing, mobility management, etc.) and transport functionality to relay traffic between the CSP network and other networks. Aggregation sites 206, 208 can serve to consolidate traffic from many different radio access networks to the core network and to direct traffic originating from the core network to the various radio access networks.

From left to right in FIG. 2, end user electronic devices 212 wirelessly connect to base stations (or radio base stations) 214 of a radio access network 202. Such electronic devices 212 are sometimes referred to as user equipment (UE) or customer premises equipment (CPE). Data traffic is often routed through a fiber transport network consisting of multiple hops of layer 3 routers (e.g., at aggregation sites) to the core network 210. The core network 210 is typically housed in one or more data centers. For data traffic destined for locations outside of the CSP network 200, the network components 222-226 typically include a firewall through which traffic can enter or leave the CSP network 200 to external networks such as the internet or a cloud provider network 100. Note that in some embodiments, the CSP network 200 can include facilities to permit traffic to enter or leave from sites further downstream from the core network 210 (e.g., at an aggregation site or RAN).

Edge locations 216-220 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, provider substrate extensions 216, 218, and 220 are in communication with a cloud provider network 100.

Typically, the further—e.g., in terms of network hops and/or distance—an edge location is from the cloud provider network 100 (or closer to electronic devices 212), the lower the network latency is between computing resources within the edge location and the electronic devices 212. However, physical site constraints often limit the amount of edge location computing capacity that can be installed at various points within the CSP or determine whether computing capacity can be installed at various points at all. For example, an edge location sited within the core network 210 can typically have a much larger footprint (in terms of physical space, power requirements, cooling requirements, etc.) than an edge location sited within the RAN 202, 204.

The installation or siting of edge locations within a CSP network can vary subject to the particular network topology or architecture of the CSP network. As indicated in FIG. 2, edge locations can generally be connected anywhere the CSP network can break out packet-based traffic (e.g., IP based traffic). Additionally, communications between a given edge location and the cloud provider network 100 typically securely transit at least a portion of the CSP network 200 (e.g., via a secure tunnel, virtual private network, a direct connection, etc.). In the illustrated example, the network components 222 facilitate the routing of data traffic to and from an edge location 216 integrated with the RAN 202, the network components 224 facilitate the routing of data traffic to and from an edge location 218 integrated with the AS 206, and the network components 226 facilitate the routing of data traffic to and from an edge location 220 integrated with the CN 210. Network components 222-226 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between an edge location 228 and the cloud provider network 100 can be broken out of the CSP network 200 without routing through the core network 210. For example, network components 230 of a RAN 204 can be configured to route traffic between an edge location 216 of the RAN 204 and the cloud provider network 100 without traversing an aggregation site or core network 210. As another example, network components 231 of an aggregation site 208 can be configured to route traffic between an edge location 232 of the aggregation site 208 and the cloud provider network 100 without traversing the core network 210. The network components 230, 231 can include a gateway or router having route data to direct traffic from the edge location destined for the cloud provider network 100 to the cloud provider network 100 (e.g., through a direct connection or an intermediate network 234) and to direct traffic from the cloud provider network 100 destined for the edge location to the edge location.

In some embodiments, edge locations can be connected to more than one CSP network. For example, when two CSPs share or route traffic through a common point, an edge location can be connected to both CSP networks. For example, each CSP can assign some portion of its network address space to the edge location, and the edge location can include a router or gateway that can distinguish traffic exchanged with each of the CSP networks. For example, traffic destined for the edge location from one CSP network might have a different destination IP address, source IP address, and/or virtual local area network (VLAN) tag than traffic received from another CSP network. Traffic originating from the edge location to a destination on one of the CSP networks can be similarly encapsulated to have the appropriate VLAN tag, source IP address (e.g., from the pool allocated to the edge location from the destination CSP network address space) and destination IP address.

Note that while the exemplary CSP network architecture of FIG. 2 includes radio access networks, aggregation sites, and a core network, the architecture of a CSP network can vary in naming and structure across generations of wireless technology, between different CSPs, as well as between wireless and fixed-line CSP networks. Additionally, while FIG. 2 illustrates several locations where an edge location can be sited within a CSP network, other locations are possible within a CSP network (e.g., at a base station) or external to CSP networks. For example, edge locations may be housed in another type of data center 112 that is distinct from the cloud provider network 100, which may be edge locations 250 managed by the cloud provider or edge locations 252 managed by another entity.

As discussed herein, users may seek to deploy functions of an application to potentially multiple different locations. As one example, a user may be developing an application for mobile devices (e.g., smart phones, wearable devices, etc.) that, to be useful, requires more computing resources for certain tasks than are made available by those devices. In such cases, the user may need to offload certain tasks to other locations, such as to edge locations (e.g., when low latency is important) and/or remote provider networks (e.g., when large amounts of resources and/or low failure rates are needed, while latency is less of a concern).

However, in these scenarios, a problem arises regarding how to split up workloads and deploy these sub-tasks to be executed in different places and further, once a user figures out how to distribute these tasks, how does the user deal with real-world issues related to failure cases. For example, it is common for machines to fail, network congestion to be encountered, computing resources not being available at particular points of time, etc. Thus, there exists a strong need to determine how to determine which computing tasks should be run at which locations, while meeting both the latency requirements of the user and also meeting the fault-tolerance needs of the user. For example, assuming that a total execution latency can even be met, while for some applications it may be acceptable to encounter a failure for an application 0.1% of the time, it may not be acceptable for the application to encounter a failure 5% of the time.

Accordingly, embodiments disclosed herein provide systems and techniques for fault-tolerant placement of functions. As used herein, the term "function placement" generally refers to determining, for a computing task (or, application), where to execute the individual sub-tasks (or, functions) that need to be performed as part of the overall task, and optionally also how to connect those tasks together so that they can communicate and transfer the data they need to perform the overall task. Fault-tolerant function placement, then, is a technique for performing placement to allow for an acceptable amount of estimated failure, e.g., placement that provides for a bounded estimated probability of the error rate expected for the overall application under a particular placement.

Figure 3:
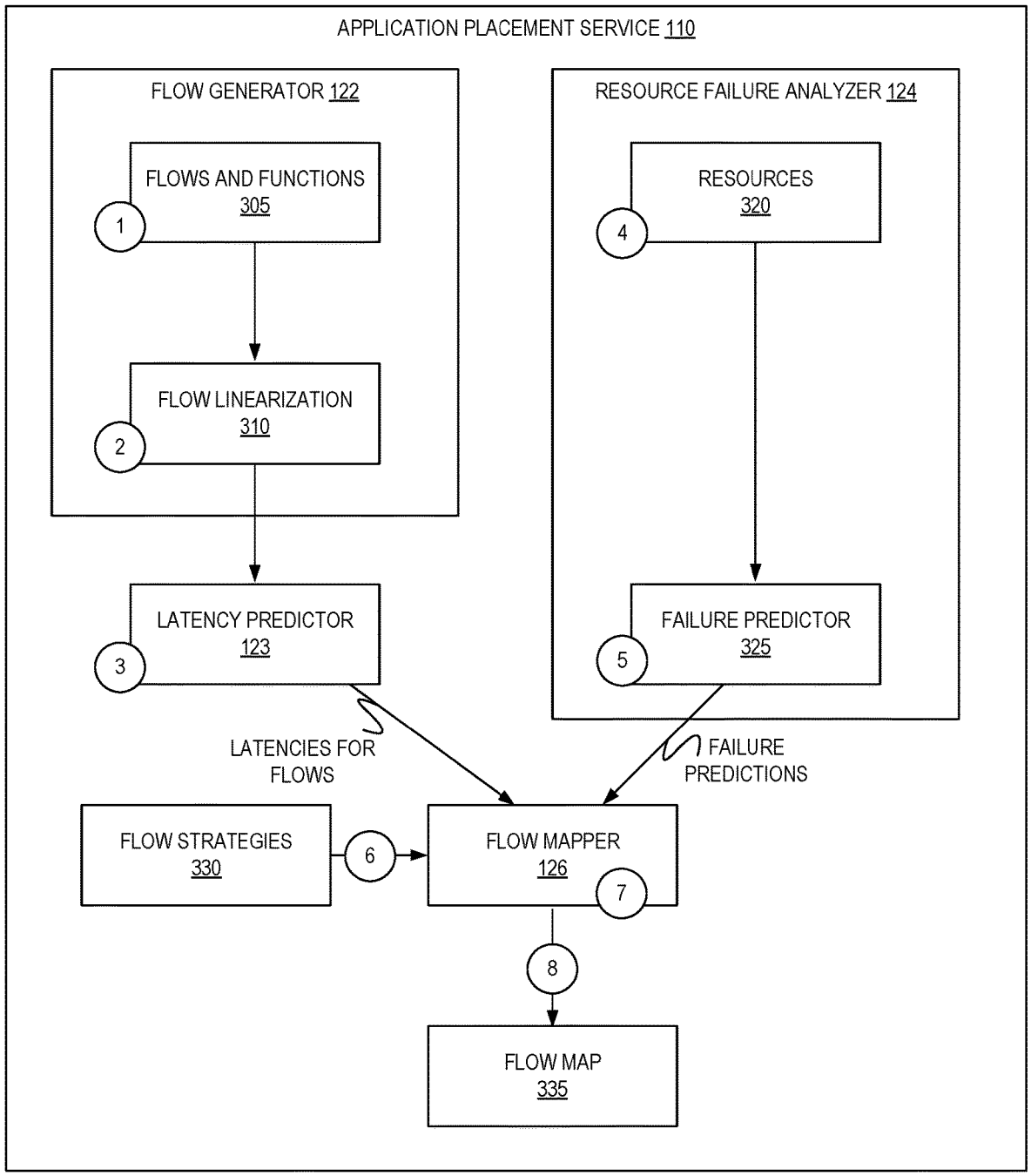
FIG. 3 is a diagram illustrating operations of a flow generator, latency predictor, resource failure analyzer, and a flow mapper of an application placement service for fault-tolerant function placement according to some embodiments.

FIG. 3 is a diagram illustrating operations of a flow generator, latency predictor, resource failure analyzer, and a flow mapper of an application placement service for fault-tolerant function placement according to some embodiments. As introduced above, a user may come to the application placement service 110 with the desire to place functions of an application across potentially multiple different computing placement locations (or tiers of locations). The user may or may not know how many copies of ones of the functions should be utilized, where each function should be placed to achieve the user's goals, or even how to place the functions. However, the user may have some preference regarding how much of an error rate is acceptable for their purposes.

In some embodiments, the user may provide placement requirements for the placement, e.g., in the form of one or more deployment criteria that must be satisfied for a placement to be valid (or acceptable) from the user's perspective. For example, the user may specify one or more of: an estimated failure rate probability that is acceptable (for the overall deployment, for individual flows of the deployment, for individual functions, etc.), what types of placement locations (or "tiers") are acceptable options for the placement of any function or for specific functions, whether particular functions must or must not be deployed to particular locations or tiers, a maximum acceptable latency allowable for any flow (or another statistical measure of latency associated with the overall deployment, individual flows, or even individual functions), a maximum average cost associated with each call to execute the application, etc. These placement requirements may be used by the application placement service 110 in identifying possible placements, optimizing the placements, etc.

Accordingly, the user may provide the application placement service 110 with an application description—and/or the application itself or functions thereof—from the user. This application description may be a data structure or file that describes the flows through an application, each with reference to a set of functions (or "components" or "subtasks"). Functions, generally, represent the individual compute tasks that make up an application (and may or may not be formal "functions" as defined by a programming language, and instead may simply be a collection of code, an executable, etc.), while the flows are the connections between the functions. A function may be viewed as similar to a mathematical operator, in that it typically operates upon one or more input elements and produces one or more output elements. This application description may be generated by a user and uploaded to the application placement service 110, generated by the user via use of interfaces and/or software provided by the application placement service 110.

The application description can be used, by the flow generator 122 of the application placement service 110, to identify, obtain, or generate a set of flows and functions 305 (as reflected by circle (1) of FIG. 3). For example, in some embodiments the application description includes a directed acyclic graph (DAG) created by the user or a modeling application used by the user, though in other embodiments the application description includes sufficient information (e.g., in the form of the data structure presented above) allowing for a graph generation algorithm to create a DAG representing the input/output flows of the application, where the vertices of the DAG are the application's functions and the directed edges represent the flows of the application. However, in other embodiments, the application description may include other data elements allowing for the flow generator 122 to generate such a graph; these data elements could include high-level descriptions of functionality of the application code, the application code itself, etc. As one example, a user in some embodiments can provide actual code to the application placement service 110, which can utilize code analysis tools to determine the paths through the code and identify the functions (e.g., portions of code, functions or methods, etc.).

As is known to those of skill in the art, network connectivity may be modeled using graph-based methods, where the term graph is used in the mathematical sense, comprising a collection of vertices and edges connecting the vertices. Such techniques may utilize calculations of connectivity based on the lengths of paths within the graph or based on the number of independent paths within the graph, for example.

In some embodiments, if paths of the graph include cycles (i.e., the graph is cyclic), the graph can be modeled it as if there was only one time "around" each cycle, thus reducing the graph to be an acyclic graph.

For example, FIG. 4 is a diagram illustrating an exemplary directed acyclic graph 410 of functions of an application and corresponding linear flows 420 according to some embodiments. The DAG 410 shown here is a simple graph including nine vertices/functions labeled (A)-(I) with two distinct input points and three distinct output points.

Thereafter, with a DAG, the flow generator 122 may linearize this graph into multiple linear flows via a flow linearization 310 process shown in FIG. 3 regarding circle (2). As shown in FIG. 4, the DAG 410 can be linearized into eight linear flows 420 that represent each distinct path through the DAG 410: ABCDE, ABCHF, ABCHI, GBCDE, GBCHF, GBCHI, GHF, and GHI. It is to be understood that this simple DAG 410 results in eight linear flows and in many real-world scenarios, the DAG 410 will be larger and/or have more vertices, resulting in a significantly larger set of linear flows 420. For example, any time a DAG 410 has vertices with an in-degree or out-degree that is greater than one, such vertices will serve as a large branching factor in terms of the number of flows that will ultimately exist. As a result, it is possible for hundreds of thousands, millions, billions, or more different linear flows that are generated.

In addition to receiving the DAG or the information/data (e.g., a textual description, actual code, etc.) provided in the application description that allows for a DAG to be generated (and thereafter generating linear flows), in some embodiments the application placement service 110 may also obtain execution characteristics associated with the functions.

For example, in some embodiments the submitting user may provide characterizations of one or all of the functions in terms of execution performance, e.g., the amount of time needed for an function to run, which may be associated with a particular amount of computing resources used (e.g., in terms of CPU/vCPU or other processing capabilities, available memory, available storage, available network bandwidth, etc.). In some embodiments, the user may provide multiple different execution characteristics for one (or multiple) of the functions, each indicating how long the function takes to run with a different amount of computing resources.

However, in some embodiments, the application placement service 110 may itself generate different execution characteristics for the functions, e.g., by testing its execution in one or multiple computing environments—such as those contemplated as possible locations/environments for placement.

Additionally, or alternatively, the application placement service 110 may utilize machine learning (ML) or other modeling techniques to generate predicted execution characteristics for functions. For example, a ML model may be trained to infer characteristic values (e.g., a predicted time to execute) based on inputs such as a representation of the code's complexity, numbers and/or types of functions used within the code, a language of the code, a size of the code, an exemplary set of computing resource availabilities (e.g., a number of cores, an amount of memory), or the like. In some embodiments, such a model may be pretrained based on other, earlier code characterizations perhaps pertaining to other deployments of potentially other users; this model may optionally be further trained based on any provided execution characterization characteristics provided by this user for ones of their functions.

In this manner, the application placement service 110 may determine execution latencies for each function in one or multiple different execution environments. With this information, the latency predictor 123 of the application placement service 110, as shown regarding circle (3) of FIG. 3, can perform a latency prediction process to generate predicted latencies for one or more (or all) of the linearized flows 420.

As described above with regard to measuring or predicting the latency of individual functions, in some embodiments this is performed while testing a set of functions in a particular flow. Thus, in some embodiments, an overall time/latency for executing a set of functions for a flow in a particular deployment environment can be measured, to result in an overall latency for the flow under a particular deployment. This process may be performed one or multiple times for a number of flows, under one or multiple different placement scenarios. For example, functions of a first flow of ABCDE could be tested with the functions deployed in a first arrangement (e.g., each deployed with a same set of computing resource availabilities—e.g., using a same sized VM) and optionally under a second arrangement (e.g., each using a same but different-than-before set of computing resources) and optionally under a third arrangement (e.g., one or more or all functions in different execution environments having different computing resource availability), etc. This information may be used, for example, to create a statistical model or as training data for a flow latency predicting ML model (e.g., relying on a gradient based algorithm, etc.), which can infer an estimated overall latency given an inputted set of functions deployed in particular locations.

It is very likely, for modern applications, that is impractical to deploy and test every possible flow individually (in terms of profiling, sampling, etc.), as profiling is very resource intensive due to the fact that it takes many times the resources than the actual execution to do data collection, sampling, and result determination. So instead, in some embodiments, a subset of the linear flows are tested to measure execution latency.

This data—regarding measured flows—may be used as training data for the flow latency prediction ML model. Based on those measurements, the model can be trained and then used to infer what time the other flows would need for execution. This arrangement is particularly helpful as typical users are unable to provide execution latency for millions or billions of flows. Instead, a user may instead provide end-to-end latencies for individual functions (or for a certain set of flows), which can be used to train the model and then be able to infer latencies for the remaining flows. Or, if the user provides executable code for the application, while the application placement service 110 can do tens, hundreds, thousands, or tens of thousands of tests to determine end-to-end latencies, in order to scale to billions of flows, the application placement service 110 can thus rely on use of the model.

Additionally, at circle (4) of FIG. 3, a resource failure analyzer 124 of the application placement service 110 can obtain (or maintain) characteristics of a set of available resources 320 available for placement, such as a set of identifiers of types of devices (e.g., a type/size of virtual machine deployed in a provider network, a type/size of virtual machine available in a first type of edge location, a type/size of virtual machine available in a second type of edge location, a type/size of client device (e.g., cellular phones or other mobile devices, personal computers or laptops, server computing devices, etc.). At circle (5) of FIG. 3, a failure predictor 325 module of the resource failure analyzer 124 can determine, based on observational data and/or stipulated data (e.g., entered by an engineer), an estimated rate of failure for each of these resources 320. For example, the failure predictor 325 may obtain recent and/or historical data pertaining to failure rates of specific edge locations, cloud network zones or regions, user devices, etc. These estimated failure rates may be represented in a variety of ways, e.g., 0.9 (90% uptime), 0.99 (99% uptime), 0.999 (99.9% uptime), etc.

At circle (6) and (7), a flow mapper 126 of the application placement service 110 can map each linear flow to a set of computational resources based on the predicted latency bounds, while also considering and/or accommodating user-specified requirements (here, providing flow strategies 330) including the user-desired error rate.

For example, the flow mapper 126—while adhering to any constraints indicating where certain functions must be placed, may be placed, or may not be placed; user-provided function co-location constraints indicating that certain functions must be placed together (e.g., in a same location or location tier); what placement locations/tiers are available for placement, etc.—may iteratively place flows at particular locations.

Figure 5:
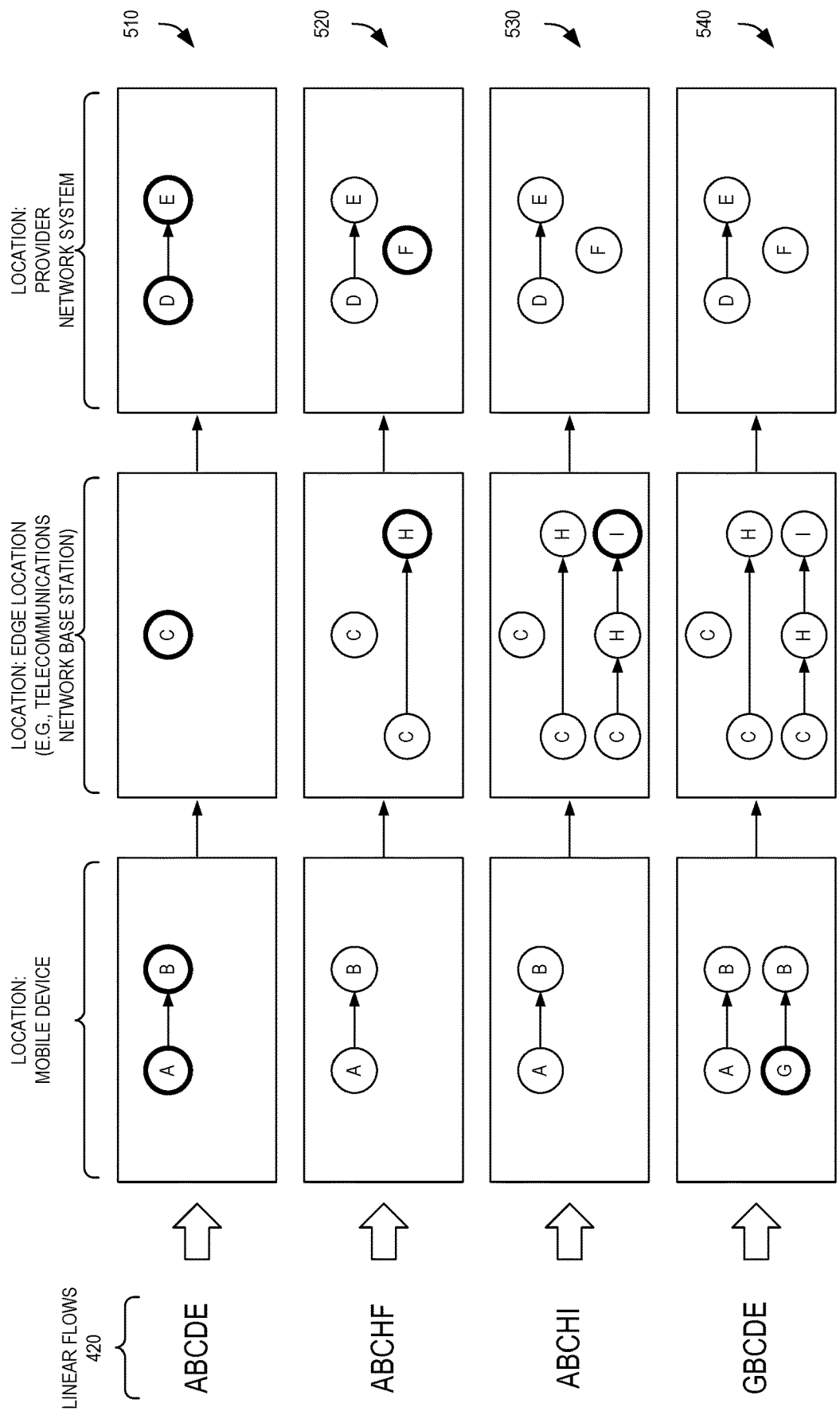
FIG. 5 is a diagram illustrating an exemplary placement configuration of linear flows according to some embodiments.

For example, FIG. 5 is a diagram illustrating an exemplary placement configuration of linear flows according to some embodiments. In FIG. 5, the flow mapper 126 may select an initial flow 420—here, flow ABCDE, and select a lowest-latency placement (e.g., based on the flow latencies resulting from latency prediction 315) at 510, again with regard to any placement constraints. In this example, this first flow ABCDE is placed with functions A and B on a mobile device (e.g., a cellular phone running the application having limited computational resources), function C in an edge location (e.g., at/near a base station of a cellular network that may located within a few miles of most users), and functions D and E in a provider network (e.g., possibly tens or hundreds of miles away from the user, though having near unlimited computational resource availabilities). This placement 510 may be made, for example, via a greedy placement scheme that identifies a lowest-latency placement configuration for the flow that adheres to any provided constraints.

A next flow—here, ABCHF—may be selected by the flow mapper and placed—here, with the differing function H being placed at the edge location tier, and function F being placed in the provider network location. This placement may be made by the flow mapper by assuming the placement of the already-placed functions (here, ABC) and selecting/identifying a lowest latency deployment for the other functions (here, HF). This process may continue at least until all functions have been placed; here, a flow for ABCHI places function I at an edge location tier location, and flow for GBCDE places function G at the mobile device tier.

With all functions being placed in this initial placement, the flow mapper 126 can determine a latency metric for the placement. For example, the latency metric may indicate a maximum latency of any flow in the placement, an average latency, etc. If the latency does not satisfy a provided user requirement, other searching techniques could be employed to attempt to find other placements that may provide the necessary latency. If no such placement can be found that satisfies a required latency value, this result can be provided back to the user and the process may halt.

However, assuming a latency-suitable initial placement, the flow mapper 126 may also calculate estimated error rate information associated with the placement. For example, the flow mapper 126 may use the particular error rates associated with different placement locations to determine individual flow error rates and/or overall placement error rates. Thus, the flow mapper 126 may calculate a failure rate value for each of the flows that have been placed, and based on these values (e.g., a maximum or minimum error rate, an average error rate, etc.), the flow mapper 126 will determine whether to improve the placement. For example, if any individual flow error rate—or the overall error rate—is not satisfactory, the flow mapper 126 may modify the initial placement to yield a modified placement that does satisfy the error rate goals/requirements. Accordingly, the flow mapper 126 may modify the placement by adding redundancy of functions within a same tier and/or within a different tier (as part of reassignment of functions to different resource tiers).

Different strategies may be implemented to cause the flow mapper 126 to modify the placement in different ways. One strategy is a greedy strategy that may iteratively pick out additional linear flows to modify, one at a time, that most greatly decrease the error rate. For example, the flow mapper 126 may keep improving whatever the "highest" error rate flow is at a time until a target error threshold is reached.

Another strategy that could be used includes a weighted greedy allocation approach in which the flow mapper 126 balances between latency increase and error rate decrease. For example, the flow mapper 126 may assign a weight factor to each parameter—e.g., latency and error rate. Thus, the value to be minimized could be based on both the latency and the error rate—e.g., (latency×factor1)+(error rate×factor2), and this value is sought to be minimized. This formulation effectively changes the notion of what "greed" is—instead of focusing on a change that most reduces the error, it instead focuses on both error reduction and latency.

These heuristic processes will yield a good result in most cases, though the result may not be completely optimal. To reach a more optimal solution, the flow mapper 126 may implement a dynamic programming optimization approach, which includes applying known minimization techniques across a multi-dimensional space to look for a best true error rate minimization, e.g., at a given cost point.

Figure 6:
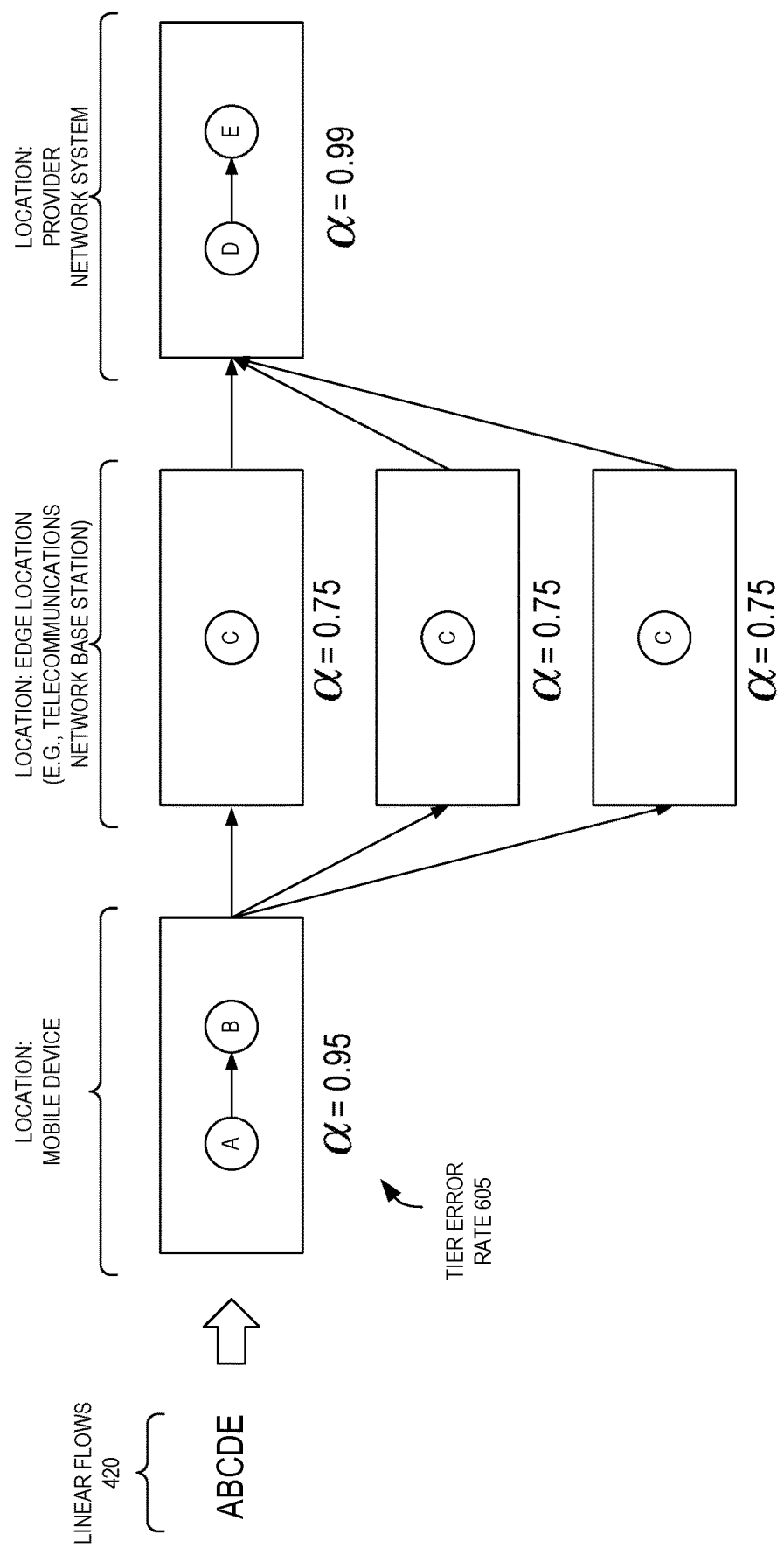
FIG. 6 is a diagram illustrating an exemplary same-tier spread-out technique for reducing predicated failure rates in fault-tolerant function placement according to some embodiments.

As a simple example, FIG. 6 is a diagram illustrating an exemplary same-tier spread-out technique for reducing predicated failure rates in fault-tolerant function placement according to some embodiments. As shown in this example, the flow mapper 126 is seeking to improve the first flow—ABCDE. As the flow mapper 126 placed functions AB to the mobile device, C to the base station, and DE to a cloud server, the flow mapper 126 can now apply the error rates to compute an overall error rate for the placement. As shown, the value of alpha indicates the error rate for each computing placement location/tier, and the estimated error rate can be determined, e.g., via multiplying the error rates together. In FIG. 6, the assigned error rates for the mobile device (0.95), edge location (0.75), and provider network (0.99) are used in some manner to calculate an overall error rate—here, we perform a simple multiplication of 0.95*0.75*0.99=0.7054.

Assuming this error rate (0.7054) is less than a required error rate (e.g., 0.85), the flow mapper 126 can identify a function to be replicated to improve the overall error rate. In this case, the flow mapper 126 does replication of function C to allow for hitting the overall failure rate target.

In this simple example, the mobile device error rate is sufficient for functions A and B, and as D and E are not latency sensitive, these functions can be put on a cloud server all the time, and only one function is a concern. However, as you increase the number of functions that can be moved between different locations (and between different flows), this will vastly expand the number of candidates that have to be searched through to find the true optimal.

Accordingly, in this example, the flow mapper 126 determines if an error rate for the flow is less than or greater than the target. If the error rate is better than the target, the process can stop and the flow can be utilized. If the error rate remains worse than our target, the process continues to find alternative placements.

In this example, the flow mapper 126 can use redundancy (e.g., in a same level/tier) to improve the error rate—e.g., multiple copies/instances of the function C are to be deployed at the base station location tier, as shown. Thus, with a 0.75 success rate, adding one more instance of the function (to have two instances) would bring success up to (1−0.25^2)=93.75% success, adding two instances (to have three total instances) brings success to (1−0.25^3)=98.44% success, and so on. Thus, by adding just one instance, the overall total failure rate is 0.95*0.9375*0.95=0.8461, which may not be good enough to satisfy the required error rate of 0.85, so the flow mapper 126 may explore adding a third function which yields a total failure rate of 0.8884, which is determined to be greater than the minimum error rate.

Figure 7:
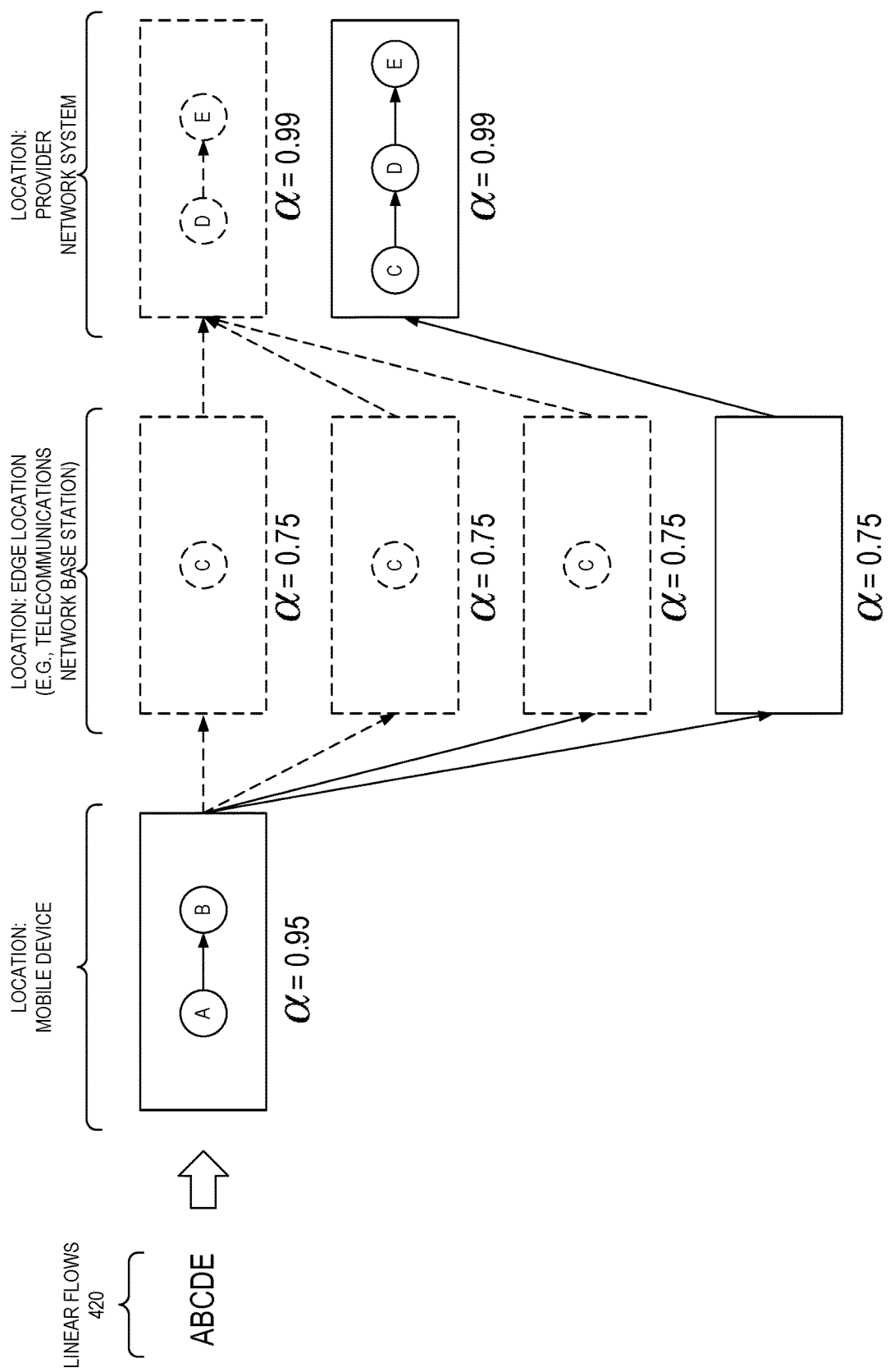
FIG. 7 is a diagram illustrating an exemplary different-tier spread-out technique for reducing predicated failure rates in fault-tolerant function placement according to some embodiments.

Another option is shown in FIG. 7, which is a diagram illustrating an exemplary different-tier spread-out technique for reducing predicated failure rates in fault-tolerant function placement according to some embodiments. In this case, one or more functions from a "worst" error rate tier (the edge location) may be moved or duplicated into another tier—here, the provider network tier. Though this results in a comparatively worse latency, it may significantly improve the error rate for this fallback scenario.

Accordingly, in various embodiments the flow mapper 126 may consider one or both of these strategies independently and/or in concert, for one or multiple "worst" flows, to improve the placement by reducing the overall error rate. The flow mapper 126 may use heuristic approaches to implement these strategies, and/or simply explore various potential options for adding redundancy, moving functions around to different tiers, etc., optionally in a side-by-side manner until the overall target failure rate is met.

At this point, the flow mapper 126 has constructed a final flow map 335 and can return the overall configuration to the user, e.g., via a user interface, a shared storage location (e.g., provided by a storage service of the provider network), email, or other communication technique. This overall configuration may indicate, to the user, which functions are to be placed where, and/or if the use of multiple configurations may be beneficial (e.g., moving function C from the edge location tier into the cloud tier), which means the user should implement failover mechanisms to detect whether the edge location is functional, and if not, perform a fallback into the cloud version of these functions.

As introduced above, the application placement service 110 may also generate a provisioning template 132 that can be utilized by an automated provisioning service 130, and provide the provisioning template 132 to the user (e.g., directly for download or presentation via a user interface, or by granting the user access to it within the provider network) so that the user could easily launch the needed resources into the configured locations, use the provisioning template 132 itself to automatically provision resources of a configuration on behalf of the user (assuming the user consented to this action, either before the placement exploration or afterward), or provide a simple user interface element to the user (e.g., a button, link, etc.) allowing the user to explicitly request the execution of the provisioning template 132. The automated provisioning service 130 (e.g., AWS CloudFormation™ or the like) may be a service that provides an easy way to create a collection of related computing resources and provision them in an orderly and predictable fashion, automating and simplifying the task of repeatedly and predictably creating groups of related resources that power applications. A provisioning template 132 may be, for example, a text-based file (e.g., in JSON or YAML format) that describes all the computing resources needed to deploy to run an application and the stack. The application placement service 110 may thus interact with the automatic provisioning service 130 to generate one or more placement templates 132 corresponding to the one or more placement configurations it has generated, allowing for the template 132 to be "run" to launch resources (e.g., VMs, serverless functions, etc.) into the particular determined computing placement locations, setup networking and/or security policies, deploy endpoints for ones of the functions to receive invocation requests originated by other functions of the applications, etc.

Additionally, in some embodiments the application placement service 110 is able to perform application reconfiguration to, for example, move or re-provision one or more functions of an application that may already be deployed. In some scenarios, it could be the case that better estimates of resource error rates are obtained, latencies have changed, aspects of the functions themselves have changed (e.g., due to patches, refactoring, updates, etc.), etc., that may lead to a different "best" placement than the placement in current use. Accordingly, in some embodiments, the application placement service 110 may be able to perform a placement (for an existing application) as described above, and determine a difference between a previous placement (or, a current deployment) and the current, "better" placement. With this difference, the application placement service 110 in some embodiments can identify and describe the different to the user, who may make the necessary changes on their own, or in some embodiments perform an automated reconfiguration of the deployed functions.

As a simple example, it may be the case that a previous placement for an application placed twenty functions across multiple placement location tiers, and a current placement indicates that one of the functions should instead be deployed differently—e.g., to a different tier, or to include additional instance redundancy. The application placement service 110 may then, for example, cause the migration of the instance in a seamless manner to avoid disrupting the application, e.g., by launching a new instance, updating routing procedures to the new instance, and then tearing down the old instance, or by simply adding additional instances of the function at the necessary locations.

Accordingly, in some embodiments, the application placement service 110 may utilize a modified weighted greedy allocation approach that may additionally rely, in part, on the use of an amount of changes needed to be made when compared to another placement, optionally together with other factors such as latency, error rate, etc. This system may encourage new placement runs to avoid making substantial changes compared to an existing placement.

Although embodiments disclosed herein primarily discuss the use of an application placement service 110 located in a provider network 100; however, some or all of this application placement service 110 can be implemented in different places. For example, in some embodiments some or all of this logic can be deployed within an application 107 to be executed as an "offline" program by an electronic computing device 104A of the user, which optionally may call the provider network 100 to perform aspects of these processes (e.g., ML model training and/or inference) that may require larger amounts of computing capacity.

Figure 8:
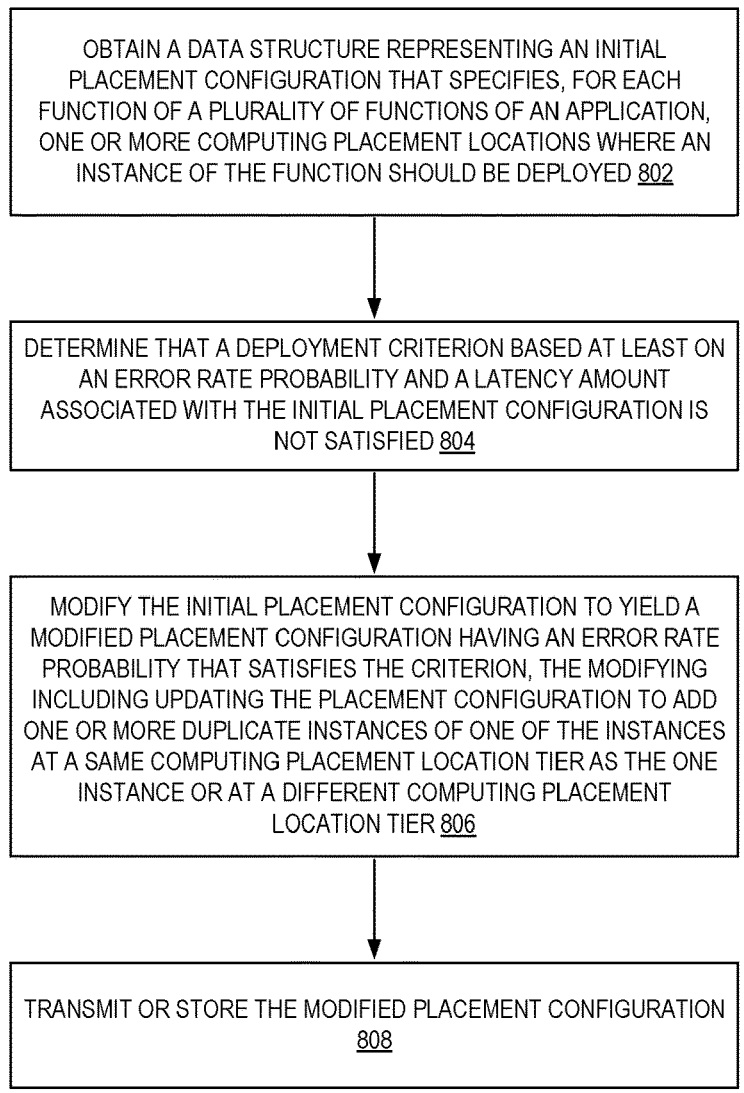
FIG. 8 is a flow diagram illustrating operations of a method for fault-tolerant function placement according to some embodiments.

FIG. 8 is a flow diagram illustrating operations of a method 800 for fault-tolerant function placement according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by the application placement service 110 of the other figures.

The operations 800 include, at block 802, obtaining a data structure representing an initial placement configuration that specifies, for each function of a plurality of functions of an application, one or more computing placement locations where an instance of the function should be deployed.

In some embodiments, block 802 includes obtaining a directed acyclic graph representing a plurality of execution flows of the application; generating a plurality of linear flows based on the directed acyclic graph; and determining one or more execution latency values for at least one linear flow of the plurality of linear flows. In some embodiments, determining one or more the execution latency values comprises: measuring the execution of a plurality of function instances of the at least one linear flow as deployed under a first placement option to yield a first execution latency. In some embodiments, determining one or more the execution latency values further comprises: measuring the execution of the plurality of function instances of the at least one linear flow as deployed under a second placement option to yield a second execution latency.

In some embodiments, block 802 further comprises: training a machine learning (ML) model based on the one or more execution latency values; inferring, via use of the ML model, a set of one or more additional execution latency values for a different one or more linear flows of the plurality of linear flows; and utilizing at least the inferred set of additional execution latency values to generate the initial placement configuration.

The operations 800 further include, at block 804, determining that a deployment criterion based at least on an error rate probability and a latency amount associated with the initial placement configuration is not satisfied.

The operations 800 further include, at block 806, modifying the initial placement configuration to yield a modified placement configuration having an error rate probability that satisfies the criterion, the modifying including updating the placement configuration to add one or more duplicate instances of one of the instances at a same computing placement location tier as the one instance or at a different computing placement location tier.

In some embodiments, the operations 800 further include receiving, from a user, the deployment criterion, wherein the deployment criterion specifies a threshold error rate associated with a valid placement of the plurality of functions of the application. In some embodiments, block 806 includes: determining an estimated error rate for a placement, according to the initial placement configuration, of a first flow of the application; and determining that the estimated error rate does not satisfy the threshold error rate. In some embodiments, block 806 further includes: adding one or more duplicate instances at the same computing placement location or same computing placement location tier as that of an instance of the first flow until an estimated error rate for the first flow satisfies the threshold error rate. In some embodiments block 806 further includes: placing at least one duplicate instance at a different computing placement location as an instance of the first flow, wherein the different computing placement location is within a cloud provider network.

In some embodiments, the operations 800 further include generating a provisioning template based on the modified placement configuration; and executing the provisioning template to programmatically deploy one or more of the plurality of functions to a plurality of different computing placement location tiers.

In some embodiments, the modified placement configuration places functions at a plurality of different computing resource location tiers; a first of the computing resource location tiers comprises an edge location within a communications service provider network; and a second of the computing resource location tiers comprises an in-region location within a multi-tenant service provider network.

The operations 800 further include, at block 808, transmitting or storing the modified placement configuration— e.g., storing it to a storage location, transmitting it to a computing device of a user, etc.

In some embodiments, the operations 800 further include performing a reconfiguration of a deployment of the application made according to the modified placement configuration, the reconfiguration comprising: determining a second placement configuration for the application, wherein the second placement configuration indicates that a first function of the plurality of functions is to be placed at a different computing placement location than as indicated by the modified placement configuration; and causing at least an instance of the first function to be migrated to the different computing placement location, wherein one or more other functions of the plurality of functions remain in the same computing placement locations after the reconfiguration.

Figure 9:
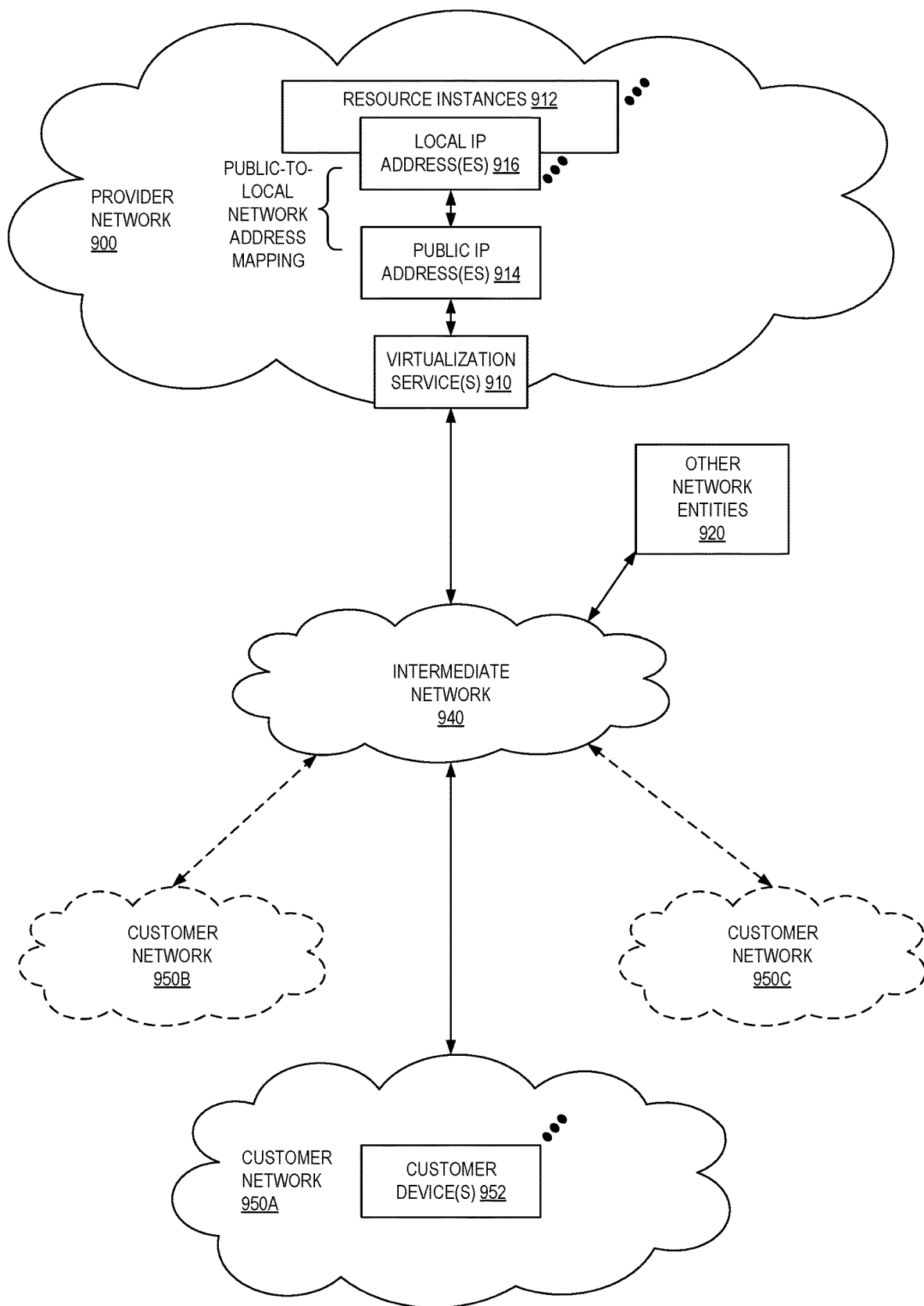
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
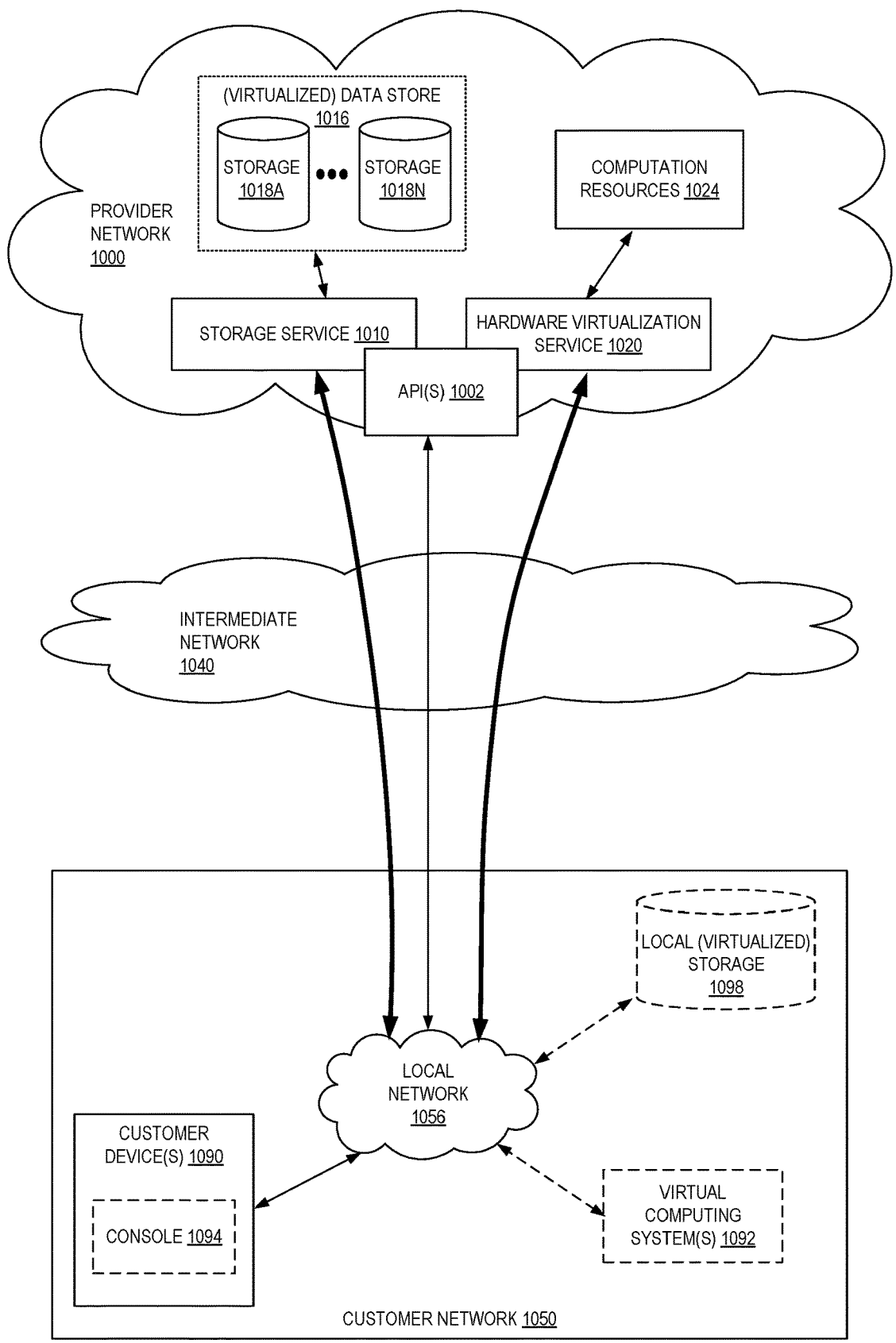
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
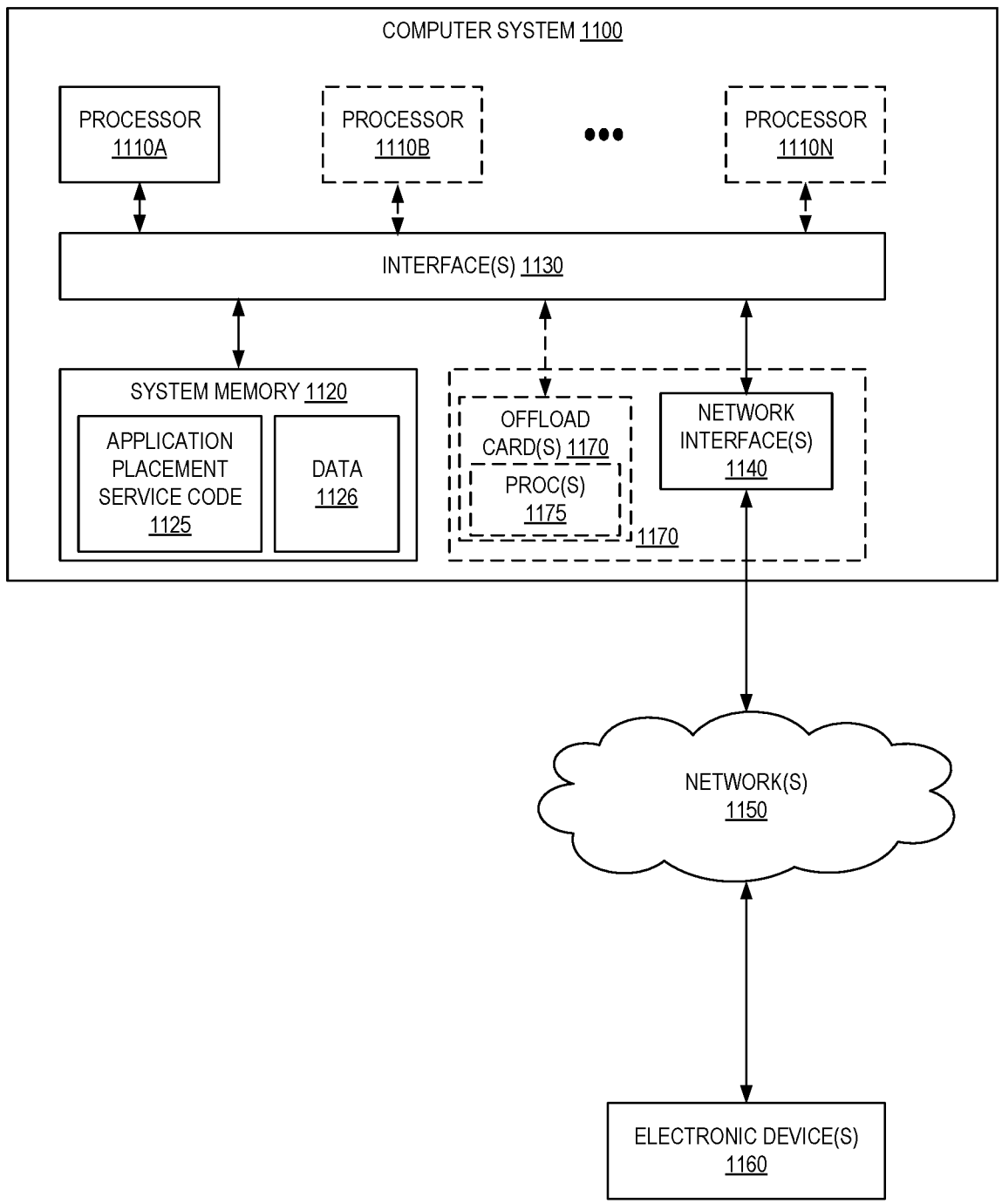
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as application placement service code 1125 (e.g., executed to implement, in whole or in part, the application placement service 110) and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining, at an application placement service of a multi-tenant provider network, an application configuration including identifiers of a plurality of functions of an application and a deployment criterion specified by a user and indicating at least a desired error rate associated with a valid placement of the plurality of functions;
   generating a data structure representing an initial placement configuration for the plurality of functions of the application, the initial placement configuration specifying, for each of the plurality of functions, one or more computing placement locations where an instance of the function is to be deployed, the generating comprising:
      obtaining a directed acyclic graph representing a plurality of execution flows of the application,
      generating a plurality of linear flows based on the directed acyclic graph,
      determining one or more execution latency values for at least one linear flow of the plurality of linear flows,
      training a machine learning (ML) model based on the one or more execution latency values,
      inferring, via use of the ML model, a set of one or more additional execution latency values for a different one or more linear flows of the plurality of linear flows, and
      utilizing at least the inferred set of additional execution latency values to generate the data structure representing the initial placement configuration;
   determining, based at least in part on the initial placement configuration, that an error rate probability associated with the application does not satisfy the deployment criterion;
   modifying the initial placement configuration to yield a modified placement configuration having an error rate probability that satisfies the deployment criterion and to create instance redundancy, the modifying including adding, to the initial placement configuration, one or more duplicate instances of one instance of the instances of the initial placement configuration at a same computing placement location tier as the one instance or at a different computing placement location tier, wherein the instances of the initial placement configuration do not include the one or more duplicate instances added; and
   transmitting at least the modified placement configuration to a computing device.

2. The computer-implemented method of claim 1, wherein the deployment criterion specifies a threshold error rate associated with a valid placement of the plurality of functions of the application, and wherein modifying the initial placement configuration to yield a modified placement configuration comprises:
   identifying a first linear flow of the application;
   determining that an error rate of the first linear flow, as placed according to the initial placement configuration, does not satisfy the deployment criterion; and
   adding one or more duplicate instances at the same computing placement location or computing placement location tier as that of an instance of the first linear flow until an estimated error rate for the first linear flow satisfies the threshold error rate.

3. The computer-implemented method of claim 1, wherein modifying the initial placement configuration to yield a modified placement configuration comprises:
placing at least one duplicate instance at a different computing placement location as an instance of a first flow of the application as indicated by the initial placement configuration, wherein the different computing placement location is within a cloud provider network.

4. A computer-implemented method comprising:
obtaining a directed acyclic graph representing a plurality of execution flows of an application;
generating a plurality of linear flows based on the directed acyclic graph;
determining one or more execution latency values for at least one linear flow of the plurality of linear flows;
training a machine learning (ML) model based on the one or more execution latency values;
inferring, via use of the ML model, a set of one or more additional execution latency values for a different one or more linear flows of the plurality of linear flows;
utilizing at least the inferred set of additional execution latency values to generate a data structure representing an initial placement configuration that specifies, for each function of a plurality of functions of an application, one or more computing placement locations where an instance of the function should be deployed;
determining that a deployment criterion based at least on an error rate probability associated with the initial placement configuration is not satisfied;
modifying the initial placement configuration to yield a modified placement configuration having an error rate probability that satisfies the criterion and to create instance redundancy, the modifying including adding one or more duplicate instances of one of the instances of the initial placement configuration at a same computing placement location tier as the one instance or at a different computing placement location tier, wherein the instances of the initial placement configuration do not include the one or more duplicate instances added; and
transmitting or storing the modified placement configuration.

5. The computer-implemented method of claim 4, further comprising:
receiving, from a user, the deployment criterion, wherein the deployment criterion specifies a threshold error rate associated with a valid placement of the plurality of functions of the application.

6. The computer-implemented method of claim 5, wherein modifying the initial placement configuration includes:
determining an estimated error rate for a placement, according to the initial placement configuration, of a first flow of the application.

7. The computer-implemented method of claim 6, wherein modifying the initial placement configuration further includes:
adding one or more duplicate instances at the same computing placement location or same computing placement location tier as that of an instance of the first flow until an estimated error rate for the first flow satisfies the threshold error rate.

8. The computer-implemented method of claim 6, wherein modifying the initial placement configuration further includes:
placing at least one duplicate instance at a different computing placement location as an instance of the first flow, wherein the different computing placement location is within a cloud provider network.

9. The computer-implemented method of claim 4, wherein determining one or more the execution latency values comprises:
measuring the execution of a plurality of function instances of the at least one linear flow as deployed under a first placement option to yield a first execution latency.

10. The computer-implemented method of claim 4, further comprising:
performing a reconfiguration of a deployment of the application made according to the modified placement configuration, the reconfiguration comprising:
determining a second placement configuration for the application, wherein the second placement configuration indicates that a first function of the plurality of functions is to be placed at a different computing placement location than as indicated by the modified placement configuration; and
causing at least an instance of the first function to be migrated to the different computing placement location, wherein one or more other functions of the plurality of functions remain in the same computing placement locations after the reconfiguration.

11. The computer-implemented method of claim 4, further comprising:
generating a provisioning template based on the modified placement configuration; and
executing the provisioning template to programmatically deploy one or more of the plurality of functions to a plurality of different computing placement location tiers.

12. The computer-implemented method of claim 4, wherein:
the modified placement configuration places functions at a plurality of different computing resource location tiers;
a first of the computing resource location tiers comprises an edge location within a communications service provider network; and
a second of the computing resource location tiers comprises an in-region location within a multi-tenant service provider network.

13. A system comprising:
a first one or more electronic devices to implement a first computing placement location located within a multi-tenant service provider network;
a second one or more electronic devices to implement a second computing placement location located outside the multi-tenant service provider network; and
an application placement service, implemented by a third one or more electronic devices, including instructions that upon execution cause the application placement service to:
obtain a directed acyclic graph representing a plurality of execution flows of an application;
generate a plurality of linear flows based on the directed acyclic graph;
determine one or more execution latency values for at least one linear flow of the plurality of linear flows;
train a machine learning (ML) model based on the one or more execution latency values;

infer, via use of the ML model, a set of one or more additional execution latency values for a different one or more linear flows of the plurality of linear flows;

utilize at least the inferred set of additional execution latency values to generate a data structure representing an initial placement configuration that specifies, for each function of a plurality of functions of an application, one or more computing placement locations where an instance of the function should be deployed;

determine that an error rate probability associated with the initial placement configuration does not satisfy a deployment criterion;

modify the initial placement configuration to yield a modified placement configuration having an error rate probability that satisfies the criterion and to create instance redundancy, the modifying including adding one or more duplicate instances of one of the instances of the initial placement configuration at a same computing placement location tier as the one instance or at a different computing placement location tier, wherein the modified placement configuration indicates that an instance of a first function is to be deployed to the first computing placement location and an instance of a second function is to be deployed to the second computing placement location, wherein the instances of the initial placement configuration do not include the one or more duplicate instances added; and transmitting or storing the modified placement configuration.

14. The system of claim 13, wherein the application placement service includes further instructions, which when executed, cause the application placement service to:

receive, from a user, the deployment criterion, wherein the deployment criterion specifies a threshold error rate associated with a valid placement of the plurality of functions of the application.

15. The system of claim 14, wherein to modify the initial placement, the application placement service is to at least:

determine an estimated error rate for a placement, according to the initial placement configuration, of a first flow of the application; and determine that the estimated error rate does not satisfy the threshold error rate.

16. The system of claim 15, to modify the initial placement, the application placement service is further to at least:

add one or more duplicate instances at the same computing placement location as an instance of the first flow until an estimated error rate for the first flow satisfies the threshold error rate.

17. The system of claim 15, wherein to modify the initial placement, the application placement service is further to at least:

place at least one duplicate instance at a different computing placement location as an instance of the first flow, wherein the different computing placement location is within a cloud provider network.

* * * * *